United States Patent
Wong

(10) Patent No.: US 7,139,896 B2
(45) Date of Patent: *Nov. 21, 2006

(54) LINEAR AND NON-LINEAR OBJECT MANAGEMENT

(75) Inventor: Wanmo Wong, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/084,338

(22) Filed: Mar. 17, 2005

(65) Prior Publication Data

US 2005/0162935 A1 Jul. 28, 2005

Related U.S. Application Data

(63) Continuation of application No. 10/233,324, filed on Aug. 29, 2002, now Pat. No. 6,928,531.

(51) Int. Cl.
G06F 12/02 (2006.01)

(52) U.S. Cl. .............. 711/218; 711/103; 711/147; 711/156; 711/165

(58) Field of Classification Search .............. None
See application file for complete search history.

(56) References Cited

U.S. PATENT DOCUMENTS

| | | | |
|---|---|---|---|
| 4,580,211 A | 4/1986 | Doki et al. ............. | 364/200 |
| 5,394,531 A | 2/1995 | Smith ..................... | 395/425 |
| 5,778,442 A | 7/1998 | Ezzat et al. ............. | 711/159 |
| 6,105,115 A | 8/2000 | Mathews et al. ........ | 711/160 |
| 6,125,424 A | 9/2000 | Komatsu et al. ........ | 711/103 |
| 6,141,251 A | 10/2000 | Xing ...................... | 365/185.11 |
| 6,141,731 A | 10/2000 | Beardsley et al. ....... | 711/136 |
| 6,202,122 B1 | 3/2001 | Yamada .................. | 711/103 |
| 6,226,728 B1 | 5/2001 | See et al. ............... | 711/171 |
| 6,327,644 B1 | 12/2001 | Beardsley et al. ....... | 711/136 |
| 6,378,043 B1 | 4/2002 | Girkar et al. ........... | 711/133 |
| 6,401,160 B1 | 6/2002 | See et al. ............... | 711/5 |
| 6,427,186 B1 | 7/2002 | Lin et al. ............... | 711/103 |
| 6,651,116 B1 | 11/2003 | Ludwig et al. .......... | 710/33 |
| 6,732,222 B1 | 5/2004 | Garritsen et al. ........ | 711/103 |
| 6,735,678 B1 | 5/2004 | Noble et al. ............ | 711/165 |
| 2003/0163660 A1* | 8/2003 | Lam ....................... | 711/170 |
| 2004/0044836 A1 | 3/2004 | Wong et al. ............. | 711/103 |
| 2004/0044840 A1 | 3/2004 | Wong ..................... | 711/105 |
| 2004/0044858 A1 | 3/2004 | Wong et al. ............. | 711/156 |

(Continued)

OTHER PUBLICATIONS

Bach, Maurice J., "The Design of the Unix® Operating System", Bell Telephone Laboratories, Inc., Prentice-Hall, Inc., Englewood Cliffs, New Jersey, 1986, pp. xi-xiv and 271-311.

(Continued)

*Primary Examiner*—Brian R. Peugh
(74) *Attorney, Agent, or Firm*—Dorsey & Whitney LLP

(57) ABSTRACT

A linear and non-linear object management method and structure. A data structure on a computer-readable medium is used to store linear and non-linear objects in a range of memory of a volume. The data structure includes a contiguous range of memory in which the data objects are stored. A plurality of data objects are stored contiguously in the range of memory and are associated with a first or second list in the range of memory. The plurality of data objects include a first-type of data object having a data field in linear objects are stored and further include a second-type of data object having a data field containing non-linear data objects.

38 Claims, 6 Drawing Sheets

U.S. PATENT DOCUMENTS

2004/0044859 A1    3/2004    Wong .......................... 711/156
2004/0044869 A1    3/2004    Louie et al. ................. 711/165
2004/0044873 A1    3/2004    Wong et al. ................ 711/218

OTHER PUBLICATIONS

Intel®, "Intel® Flash Data Integrator (FDI) User's Guide", Version 4, Aug. 2001, pp. ii-314.

Jones, Richard, et al., "Garbage Collection Algorithms for Automatic Dynamic Memory Management", John Wiley & Sons Ltd., Chichester, England, 1996, pp. vii-xxvi and 1-41.

Silberschatz, Abraham et al., "Operating System Concepts, Fifth Edition", Addison Wesley Longman, Inc., 1998, pp. v-xvii and 239-336.

Tanenbaum, Andrew S., "Operating Systems: Design and Implementation", Prentice Hall, Inc., Englewood Cliffs, New Jersey, 1987, pp. vii-xvi and 191-250.

* cited by examiner

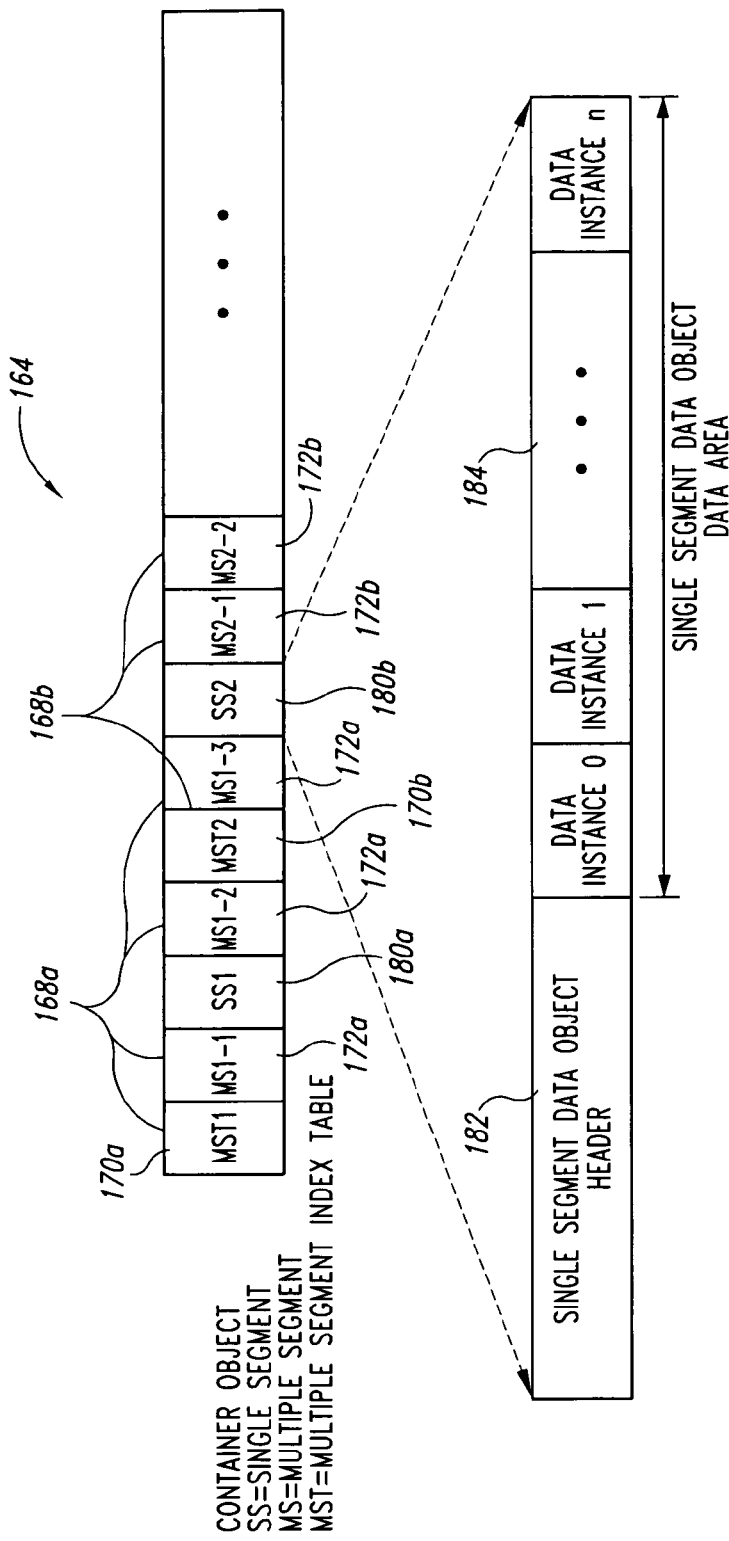

| NUMBER | STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER AND DATA | WRITING_DATA | WRITE STATE AND DATA |
| 005 | WRITING_DATA | 1111 0000 | SKIP HEADER AND DATA | WRITTEN_DATA | WRITE STATE WHEN FINISH WRITING DATA |
| 006 | WRITTEN_DATA | 1110 0000 | CHANGE STATE TO VALID_DATA | VALID_DATA | WRITE STATE |
| 007 | VALID_DATA | 1100 0000 | NONE | INVALID_DATA | WRITE STATE |
| 008 | INVALID_DATA | 1000 0000 | SKIP HEADER AND DATA | ERASE_PARTIAL | ERASE DATA OUTSIDE THE FLASH BLOCK AND WRITE STATE |
| | | | | EMPTY | ERASE FLASH BLOCK |
| 009 | ERASE_PARTIAL | 0000 0000 | SKIP HEADER AND DATA UP TO FLASH BLOCK | EMPTY | ERASE FLASH BLOCK |

Fig. 6

LINEAR AND NON-LINEAR OBJECT MANAGEMENT

CROSS-REFERENCE TO RELATED APPLICATION

This application is a continuation of pending U.S. patent application Ser. No. 10/233,324, filed Aug. 29, 2002 now U.S. Pat. No. 6,928,531.

TECHNICAL FIELD

The present invention is related generally to now U.S. Pat. No. 6,928,531 the field of data object management, and more particularly, to data object management of linear and non-linear objects in semiconductor memory devices, such as flash memory devices.

BACKGROUND OF THE INVENTION

Non-volatile memory is a type of memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes or erased in blocks of memory. The blocks of memory typically range from 8 kBytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video, and provide personal digital assistant (PDA) capabilities. As a consequence, cellular phones need to be able to store different types of data and information. For example, whereas older cellular phones would only need to store data representing phone numbers, newer cellular phones need to store phone numbers, voice information, computer graphic images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information and image files can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile, and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, has unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must first be erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated with each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software performs many of the same functions, the process by which the functions are performed can be very different, with some being more efficient or providing a greater level of data integrity than others. For example, where information regarding the mapping of data within a memory is maintained in a single table corresponding to one physical block of flash memory, corruption of the single table, such as in the event of a power failure during a write operation to the table, will leave the flash memory device in a questionable state. Another example is using only a single physical block of flash memory to aid in the reclamation process, which may result in an inefficient iterative write and erase process when the data objects stored in memory are large and which may corrupt the data objects if interrupted by a power loss. Therefore, there is a need for alternative memory management processes that can be implemented for flash memory devices.

SUMMARY OF THE INVENTION

The invention is directed to a linear and non-linear object management method and structure. A data structure on a computer-readable medium is used to store the linear and non-linear objects together in a range of memory of a memory space. The data structure includes a contiguous range of memory in which the data objects are stored. A plurality of data objects are stored contiguously in the range of memory. The plurality of data objects include a first-type of data object having a data field containing data representing linear objects and further include a second-type of data object having a data field in which non-linear objects are contained.

In one aspect of the invention, a memory system having a non-volatile memory is provided. The non-volatile memory includes an addressable range of memory in which a data structure for storing data objects in the addressable range of memory is stored. The data structure includes a plurality of data objects stored contiguously in the addressable range of memory. The plurality of data objects includes at least one first-type data object having a data field in which data is stored in consecutive memory addresses and further includes at least one second-type data object having a data field in which non-linear objects are stored.

In another aspect of the invention, a memory system having a non-volatile memory and a computer readable medium is provided. The non-volatile memory includes a memory space and the computer-readable medium includes computer-executable instructions for performing steps for storing data objects in the memory space. The steps for storing data objects in the memory space includes defining in the memory space a range of memory having a starting memory address and an ending memory address, and further defining a first list of data objects associated with the starting memory address and defining a second list of data objects associated with the ending memory address. The steps further includes writing a first data object to at least one of the first and second lists of the range of memory and writing a second data object to at least one of the first and second lists of the range of memory. The first data object has a header and a data field, the data field containing data stored at consecutive memory addresses, and the second data object has a header and a data area, the data area containing at least one non-linear object.

In another aspect of the invention, a memory system having a non-volatile memory and a computer-readable medium is provided. The non-volatile memory includes a range of memory, and the computer-readable medium includes computer-executable instructions for performing steps for storing data objects in the non-volatile memory. The steps for storing data objects in the non-volatile memory include storing linear data objects in a linear object and storing non-linear data objects in a container object. The linear object is defined in the range of memory and has a linear object header and a linear object data field in which the linear data objects are stored. The container object is defined in the range of memory having a container object header and a container data filed in which the non-linear data objects are stored.

BRIEF DESCRIPTION OF THE DRAWINGS

FIG. 5 is a drawing of a single segment data object in the container object of FIG. 4 in accordance with an embodiment of the present invention.

FIG. 6 is a table showing object states for data objects according to an embodiment of the present invention.

DETAILED DESCRIPTION OF THE INVENTION

Embodiments of the present invention are directed to management of linear and non-linear objects in a range of flash memory. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
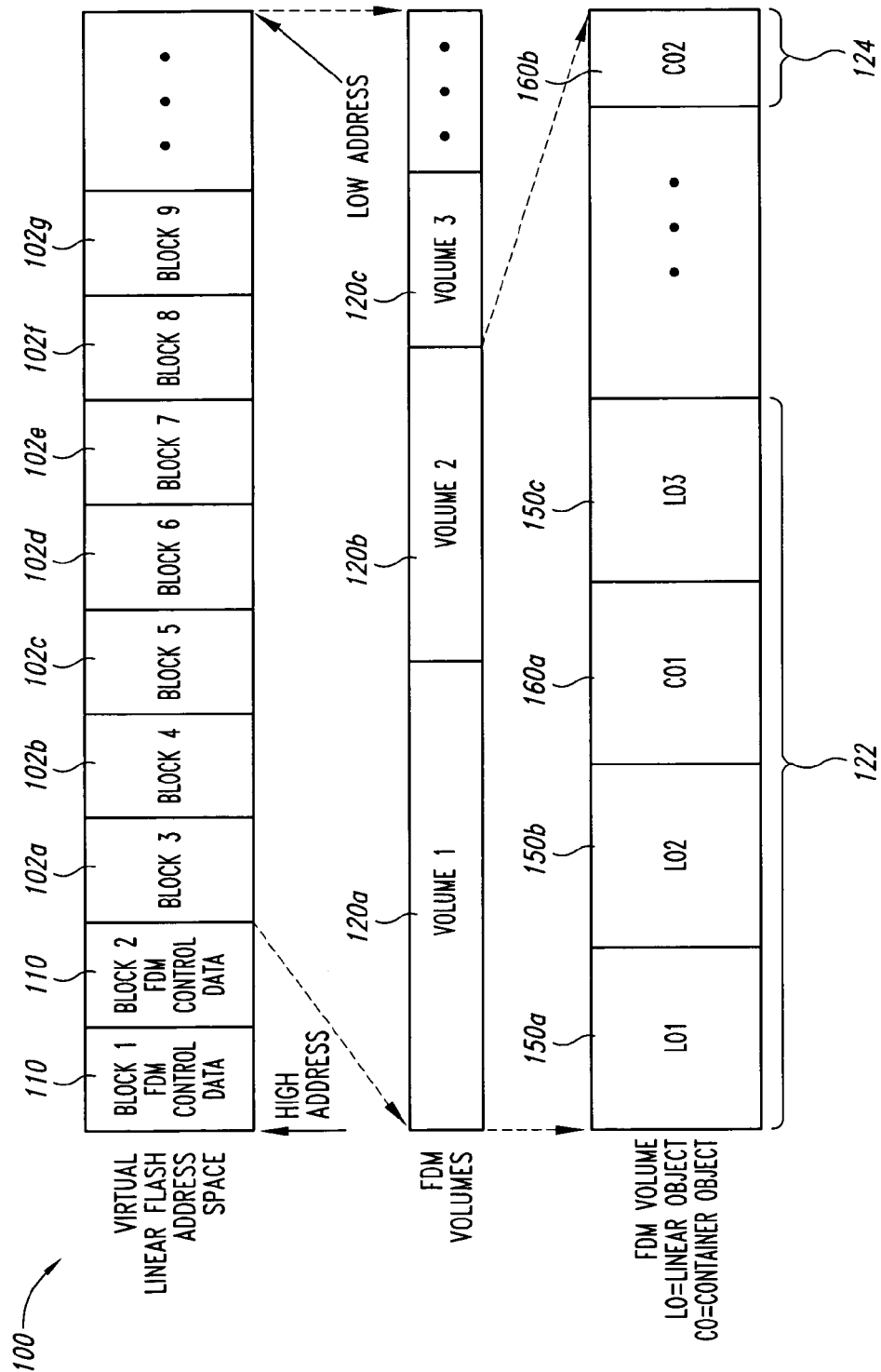
FIG. 1 is a drawing of a data architecture according to an embodiment of the present invention.

FIG. 1 shows a data architecture 100 in which embodiments of the present invention can be employed. The data architecture 100 can be used by a flash data manager (FDM) process to handle data objects in flash memory. The data architecture 100 associates volumes 120 to physical flash memory blocks 102 of one or more flash memory devices. Generally, the volumes 120 can be variable in size, and may be modified by a user subsequent to compile time of the user's application. As a result, the boundaries of the volumes 120 can be adjusted during run time of an application. The volumes 120 can also span multiple flash memory blocks 102 and have boundaries that do not correspond to flash memory block boundaries. However, in this case, additional overhead may be necessary to process the partial flash memory blocks during erasing and writing operations to the volume 120.

Each of the volumes 120 has a contiguous range of memory that is defined by data written in FDM control blocks 110. In an embodiment of the present invention, two FDM control blocks 110 are used to store volume definition information. In this manner, one of the FDM control blocks 110 can be kept in an erased state while the other FDM control block 110 contains current volume definition information. Updating volume definition information requires new data to be written in the FDM control block. After the volume definition information is updated often enough, resulting in the volume definition information exceeding the available memory of one FDM control block 110, only the valid volume definition information is copied from the present FDM control block 110 to the FDM control block 110 in the erased state to allow for the memory of the other FDM control block to be reclaimed. The process of alternating between the two FDM control blocks allows volume definition information to be updated an unlimited number of times while ensuring that valid volume definition is available even in the event of a power loss.

The contiguous range of memory spans a range of memory addresses that begin with a starting address and terminates with an ending address. Within the range of memory defined by the data written in the FDM control blocks 110, data objects can be stored. Each data object stored by the volume 120 is categorized as either a linear object 150 or a container object 160. A linear object 150 is generally used to store data in linear or consecutively addressed fashion, such as application code. In contrast, non-linear objects generally store data that can be stored in non-contiguous segments of memory. The container objects 160 are used to store non-linear data in a "linear" fashion. As a result, linear objects 150 and non-linear objects, in the form of containers 160, can be stored anywhere within the available memory space of the volumes 120, and partitioning the memory space of a flash memory into two regions, one region specifically for linear data and another region specifically for non-linear data, is not necessary. Consequently, in embodiments of the present invention, the memory space of flash memory can be utilized in an open manner, storing data objects in the available memory space independent of the particular type of data, rather than accommodating a fixed partitioned memory space where the location at which data is stored in memory is governed by the particular data type (i.e., either linear or non-linear).

The linear objects 150 and container objects 160 are stored in the volume 120 in two lists that are associated with a respective end of the contiguous range of memory. A list can be generally defined as a collection of data objects stored contiguously. A "top list" starts from a high memory address location and extends toward descending memory addresses of the range of memory as data objects are added to the end of the top list. Conversely, a "bottom list" starts from a low memory address location and extends toward ascending memory addresses of the range of memory as data objects are added to end of the bottom list. By having a "top" and "bottom" list for each data volume object 120, a dual list arrangement is created. Each of the data objects within the volume 120 are cataloged in one of these lists. As will be described in greater detail below, the linear object 150 and the container object 160 have headers that include information related to the respective data object, and are used to implicitly link together the linear and container objects 150, 160 to form the two lists. It will be further appreciated that the use of the terms "top" and "bottom" lists have been used to aid in the understanding of embodiments of the invention. The particular association of a list with particular memory addresses in the previous description has been provided by way of example. The previous description is not intended to limit the present invention to a particular arrangement of top and bottom lists to high and low memory addresses. More generally, in embodiments of the present invention, first and second lists of data objects are associated with first and second ends of a volume. A more detailed description of the volumes 120, and object management thereof, is provided in commonly assigned, co-pending U.S. application Ser. No. 10/232,952, entitled DYNAMIC VOLUME MANAGEMENT, to Wong, filed Aug. 29, 2002, which is incorporated herein by reference. Additionally, a more detailed description of data object management for is provided in commonly assigned, co-pending U.S. application Ser. No. 10/232,841, entitled SYSTEM AND METHOD FOR LINEAR OBJECT REALLOCATION IN PLACE, to Louie et al., filed Aug. 29, 2002, which is incorporated herein by reference.

Figure 2:
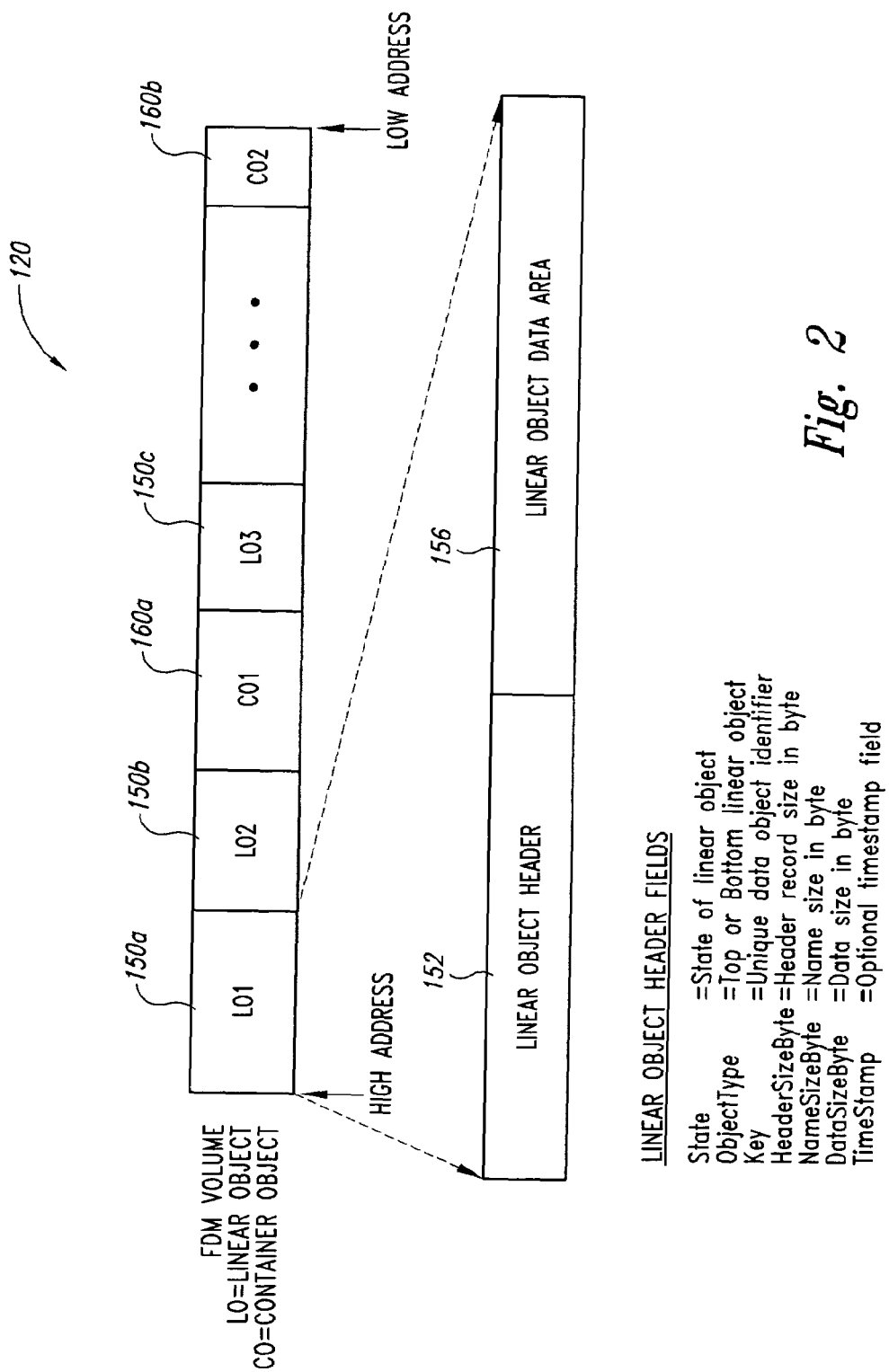
FIG. 2 is a drawing of a linear object according to an embodiment of the present invention.

As previously mentioned, and as shown in FIG. 1, the data objects of the volume 120 are categorized into linear objects 150 and container objects 160 in which non-linear objects can be stored. FIG. 2 shows the linear object 150 according to an embodiment of the present invention. The linear object 150 includes a linear object header 152 and a linear object data area 156. The linear object header 152 includes various fields containing information related to the particular linear object 150. For example, one field included in the linear object header 152 is a state field that contains data representative of an object state of the linear object 150. The linear object key field in the linear object header 152 includes data used to uniquely identify the particular linear object 150, and the linear object data area 156 includes the data of the linear object 150. In the linear object data area 156, data is stored in a linear or sequentially addressed fashion. Examples of the types of data of a linear object 150 include application code, which is desirable to store in consecutive memory addresses to allow for the code to be executed by a processor directly from the flash memory.

Figure 3:
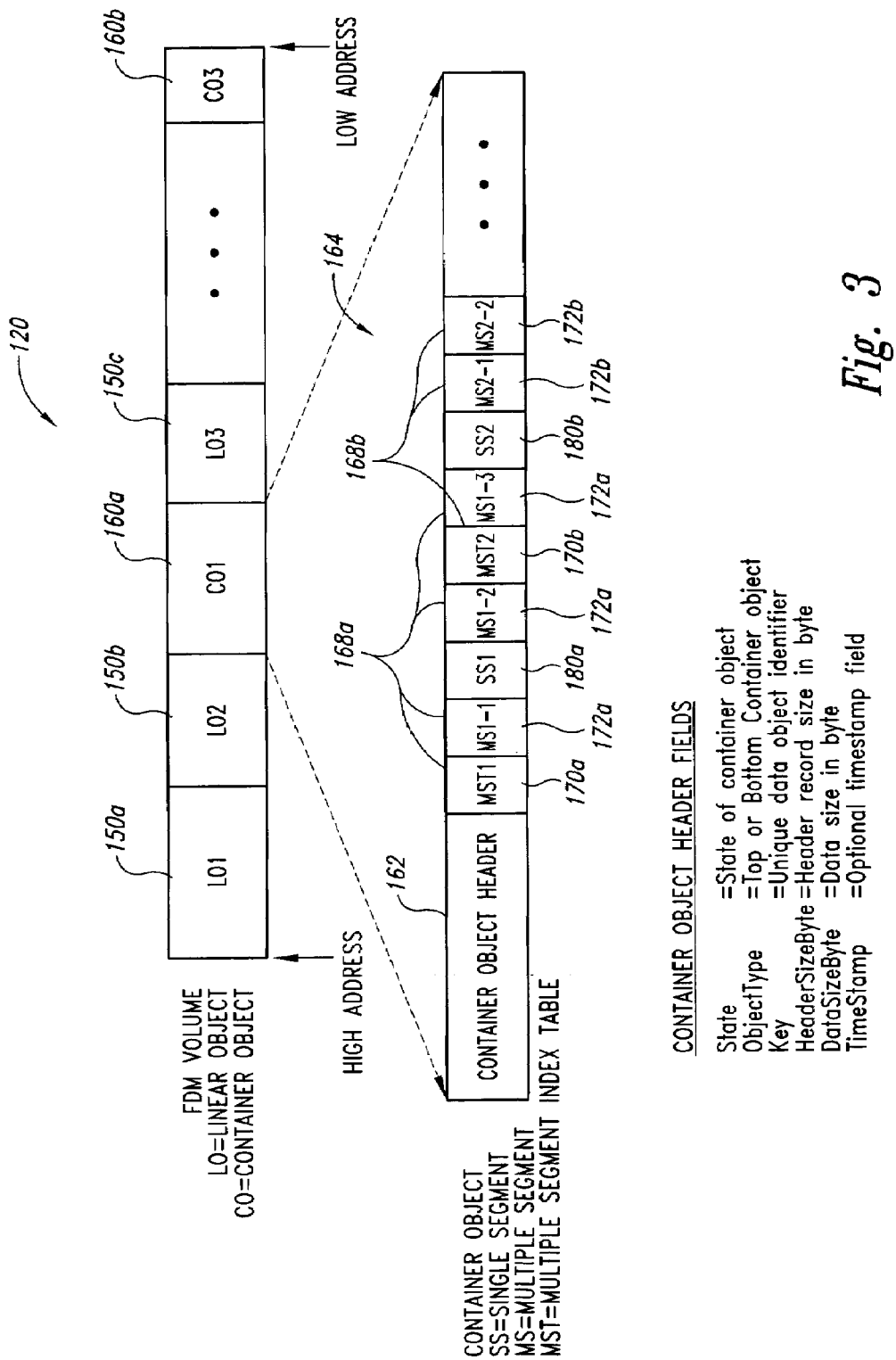
FIG. 3 is a drawing of a container object according to an embodiment of the present invention.

FIG. 3 illustrates the container object 160 according to an embodiment of the present invention. The container object 160 includes a container object header 162 and a container data area 164. As with the linear object headers 152 (FIG. 2), the container object header 162 similarly includes data related to the container object 160. For example, the container object header 162 includes a state field that contains data indicative of the object state for the container object 160. In the container data area 164, data objects of a non-linear or non-consecutively addressed nature are stored. As will be explained in more detail below, the type of data objects stored in the data area 164 of the container object 160 generally represent data that can be stored in non-contiguous segments. The container object 160 is used to store the non-linear data in a linear fashion in the data area 164, thereby enabling linear data (i.e., linear objects 150) and non-linear data (i.e., container objects 160) to be intermixed throughout the available memory space of the volume 120. As illustrated in FIG. 3, the non-linear objects that are stored in the container data area 164 are categorized as either a multiple segment (MS) data object 168 or a single segment (SS) data objects 180.

Figure 4:
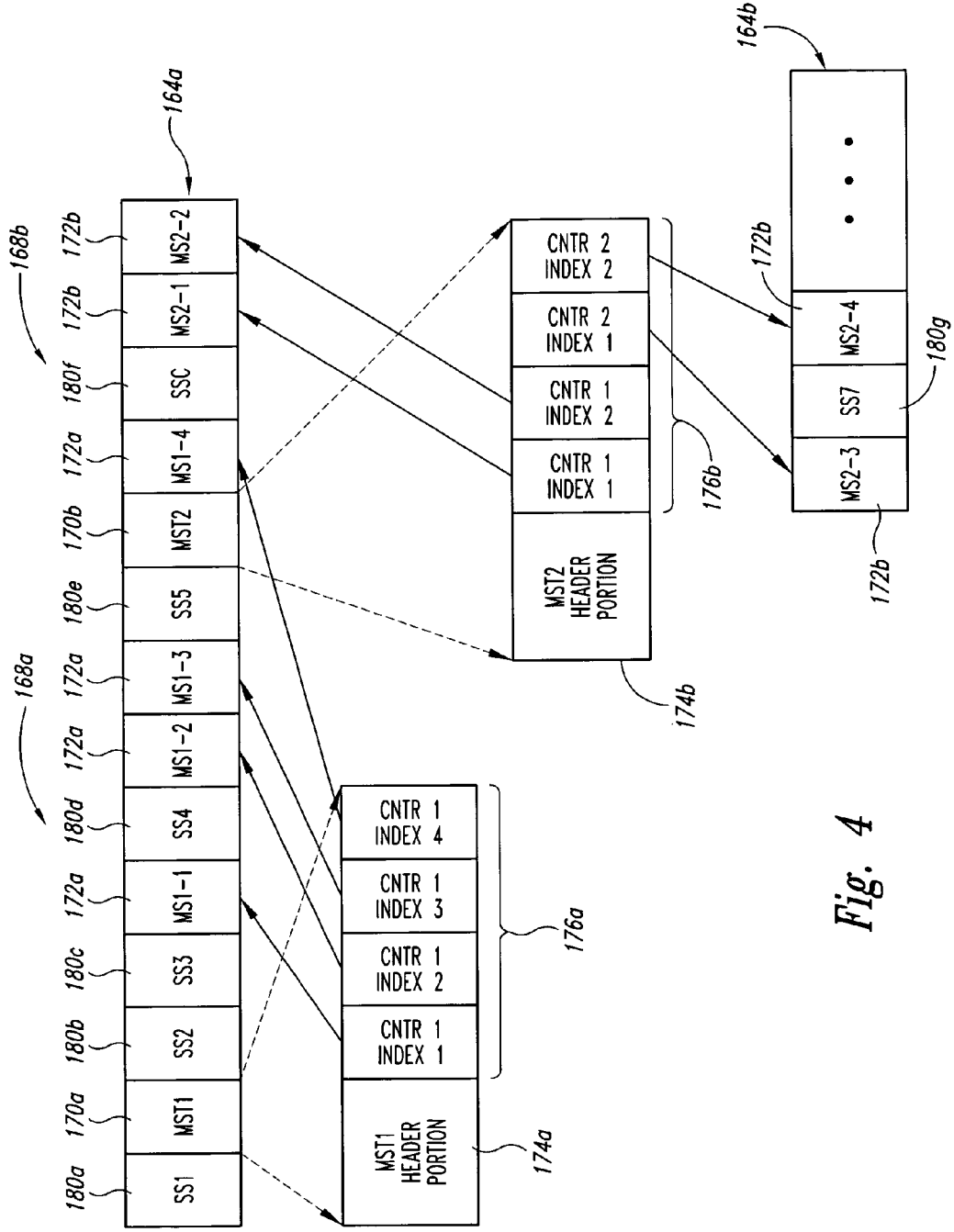
FIG. 4 is a drawing of a multiple segment data object in the container object of FIG. 4 in accordance with an embodiment of the present invention.

As shown in FIG. 4, MS data objects 168 represent multiple data segments 172 that are associated with one another to form a relatively large data object in the form of a non-linear object. The structure uses two types of objects: MS data object index tables 170 and data segments 172, which can be stored in the container data area 164*a*, 164*b* along with SS data objects 180. The MS data object index tables 170 contain a header portion 174 which defines the state, identity, and other aspects of the MS data object 168, and an index table 176, which contains index entries that identify the data segments 172 comprising the body of the MS data object 168. As shown in FIG. 4, the index entries identify the container and index entry for each data segment 172. Each data segment 172 has its own header (not shown) which defines its state, identity, and other aspects of that particular data segment.

The MS data object 168 can be embodied in more than one way. In one embodiment, a single MS data object index table 170 can be used for an entire MS data object 168, regardless of the size of the data object. In the MS data object 168, there is no limitation on the number or size of the data segments 172, as these parameters can be set by specifying them in the appropriate fields in the MS data object index tables 170 and data segment headers. A single MS data object index table 170 can potentially become quite large, in some instances, by writing a new MS data object index table 170 after each update. This may result in an index table that consumes a large portion of a container object and leaves only a small portion of the container object for storage of data segments or other non-linear objects. Moreover, a large MS data object 168 might result in a large index MS data object index table 170, that potentially could become significant to reallocate and rewrite. A second embodiment allows for multiple MS data object index tables 170 to be used to index the data segments 172 in the MS data object 168. Accordingly, only a shorter MS data object index table 170 might need to be reallocated and/or rewritten as data segments 172 are changed or added. As illustrated, the MS data object index tables 170 may span multiple container objects, thereby avoiding the issue with a single MS data object index table 170 consuming a large portion of a single container object. In the second embodiment, a next index table field (not shown) would identify the next MS data object index table 170 used to index the data object. In the first embodiment, the next index table field simply contains a NULL value to signify it is the only MS data object index table. Management of MS data objects 170 is discussed in greater detail in commonly assigned, co-pending U.S. application Ser. No. 10/232,822, entitled MULTIPLE SEGMENT DATA OBJECT MANAGEMENT, to Wong et al., filed Aug. 29, 2002, which is incorporated herein by reference.

SS data objects 180, on the other hand, are relatively small and have data self-contained in a single segment of the memory space. As shown in FIG. 5, the SS data object 180 includes an SS data object header 182 and an SS data object data area 184. The SS data object header 182 contains various fields. As with the MS data object table header portion 174 (FIG. 4), the SS data object header 182 includes a state field that contains data representative of an object state of the SS data object 180. The SS data object data area 184 can be used to store instances of data having a length less than one read/write unit. A read/write unit is typically the minimum byte size that can be stored in memory and perform flash device input/output operations. The read/write unit is defined by a developer at compile time, and can be used as the default size of a SS data object 180 where the developer does not specifically define the length of the SS data object 180. However, the SS data object 180 is not restricted to a single read/write unit, and can be of greater length where desirable. For example, where it is anticipated that the data will be updated often, the developer can define the SS data object 180 to be greater than one read/write unit.

Within the SS data object data area 184 data instances can be updated "in place" by writing new data instances therein and changing the object state of an earlier data instance to indicate that it has been updated. This avoids the need to define a new data object when updating existing data with new information. Additionally, the SS data objects 180 allow for variable length updating, that is, updated data having a different length than the previous data instances can be written to available memory within the memory space allocated for an SS data object 180. The SS data object 180 represents another type of data object, in addition to the MS data object 168, that is non-linear and can be stored in non-contiguous segments of the container object 160. An example of the type of data represented by an SS data object 180 is phone numbers of a user phone book. Management of SS data objects is discussed in greater detail in commonly assigned, co-pending U.S. application Ser. No. 10/232,840, entitled SINGLE SEGMENT DATA OBJECT MANAGEMENT, to Wong et al., filed Aug. 29, 2002, which is incorporated herein by reference.

As previously described, the linear object 150 (FIG. 2), the container object 160 (FIG. 3), the MS data object 168 (FIG. 4), and the SS data object 180 (FIG. 5) employ a header that includes a state field containing data representing the object state of the data object. FIG. 6 shows a table of object states that can be employed in the various data objects according to an embodiment of the present invention. In summary, the "EMPTY" state indicates free erased memory space available for writing. The "WRITING_HDR_LEN" state indicates that a header length is being written. The "WRITING_HDR" state indicates that the data object header is in the process of being written, such as writing the object state, but there is currently no data stored. The "WRITTEN_HDR" state indicates that the header is complete. The "WRITING_DATA" state indicates that data is being written and the data size is known. The "WRITTEN_DATA" state indicates that data has been written but not yet marked as valid. The WRITTEN_DATA state distinguishes between a copy of an object and the original object during the data copying process, in the event power loss occurs during a reclamation process or an update process. The WRITTEN_DATA state also distinguishes the completed state of the object during the creation of the object for the first time in the event of power loss recovery. The VALID_DATA state indicates that the stored data is valid. The INVALID_DATA state indicates that the data is freed and, as will be explained in more detail below, is eligible for reclamation. As shown in the table of FIG. 6, the INVALID_DATA state can transition into an ERASE_PARTIAL or EMPTY state depending on whether the ERASE_PARTIAL state is applicable. The "ERASE_PARTIAL" state, indicates that the data beyond the boundary of a flash block is erased. This state can only exist in objects at the end of a list. As will be explained in more detail below, the granularity of the object states facilitates a power loss recovery process that can be used to recover data in the event of power loss and ensure uncorrupted data can be located.

As shown in the table of FIG. 6, the object state of a data object can be represented by a binary value. Each state change clears a single bit of the binary value. As the object state of a data object changes over time, the FDM updates the state field of the respective data object to reflect data transitions from one object state to another by programming the value corresponding to the new object state. As the object state of a data object transitions, for example, from an EMPTY state to a WRITING_HDR_LEN state, and where the least significant bit (LSB) corresponds to the WRITING_ HDR_LEN state, the state field will change from 1111 1111 to 1111 1110. As known by those of ordinary skill in the art, in the case of NOR flash memory devices, an unprogrammed (i.e., erased) memory cell of flash memory is represented by a value "of" and a programmed memory cell is represented by a value of "0" (in contrast to NAND flash memory devices, where the process is inverted). Consequently, in updating the object state from EMPTY to WRITING_HDR_LEN, the value 1111 1110 can be written directly to the state field without the need for erasing any cells because only the LSB needs to be programmed to indicate a change in object state. The other bits remain unprogrammed. As the object state transitions, each succeeding bit gets programmed to reflect the change in object states. For example, if the second to the LSB corresponds to a WRITING_HDR state, then the state field is modified from 1111 1110 to 1111 1100 when the state of the data volume object 120 transitions from the WRITING_HDR_LEN state after the header record and state have been written. It will be appreciated that the previous example was provided for the purpose of illustration, and the correspondence of bits to states can be modified without departing from the scope of the present invention. Consequently, the foregoing example is not intended to limit the scope of the present invention to any particular embodiment.

Additionally, in alternative embodiments of the present invention, alternative fields may be included in addition to the state field in the data object headers. Some examples of the types of information that can be included in the header of the various data objects are as follows:

ObjectType=type of data object (i.e., linear object, MS data object, SS data object);
Key=unique data object identifier;
HeaderSizeByte=header record size in bytes;
DataSizeByte=Data size in bytes; and
TimeStamp=optional timestamp field.

The ObjectType field contains data representing the type of data object. The key field contains data representing a unique identifier that can be used to identify the particular data object. The DataSizeByte field contains data representing the length of the data field of the data object, allowing the memory space of each data object to be variable in length and defined by a developer. An optional TimeStamp field containing data representing the time at which the data object was written can also be included in the header when desired. The HeaderSizeByte field contains data indicative of the length of the header, and is used when optional fields are included in the header for some data objects and not for others. For example, where it is desirable for the optional TimeStamp field to be included in the data object header, the value of the HeaderSizeByte field can be specified to accommodate the additional length necessary to include the TimeStamp field. Other data objects not having the optional TimeStamp field will have shorter headers.

It will be appreciated by those of ordinary skill in the art that the particular information included in the header blocks of the data objects may be modified without departing from the scope of the present invention. The previous example has been provided for the purpose of illustration, and alternative fields and information can be included in the header as well. The particular information included in the headers of the data objects will depend on the relevance of that information to the particular type of data object, as shown in FIGS. 2–5. Moreover, it will also be appreciated that the previous example was provided for the purpose of illustration, and alternative fields and information can be included in the header of the different data objects without departing from the scope of the present invention. Consequently, the foregoing example is not intended to limit the scope of the present invention to any particular embodiment described herein.

Various processes of the FDM use the information in the data object headers of the linear object 150, the container object 160, the MS data object 168, and the SS data object 180 in handling the data objects. For example, a power loss recovery process uses the information in the headers for data recovery in the event of a power failure. When a power loss recovery process is performed, the saved data can be restored by examining object state information contained in each header of the various data object. That is, a power loss recovery process can make the determination on how to take action based on the object state of the data object. For example, assuming that the object states shown in FIG. 6 are being used, when the data object has an EMPTY state will no action be taken during the power loss recovery process. When the data object has a VALID_DATA state, the power loss recovery process determines whether any other copies of the data object exist and which copy should be recovered. For all other object states, it is assumed that parts of the data object are unreliable or in an incomplete state, the data state is changed to an INVALID_DATA state, and are ignored by skipping past the appropriate portions of memory. The power loss recovery process will transition the information in the state field of the new data objects having a WRITTEN_DATA state to a VALID_DATA state, and any corresponding copies of the data objects having a VALID_DATA state to an INVALID_DATA state. In this manner, uncorrupted data can be guaranteed in the event flash operation is interrupted by power loss. Thus, in the worst case, a power failure during the updating of a data object results in the loss of the new data. The old data remains valid and can be recovered.

A reclamation process according to an embodiment of the present invention also uses the information of the state field to determine which blocks of memory of the volume 120 can be erased to reclaim memory when there is insufficient free memory space to allocate a data object. A data object can be discarded by the reclamation process when the state of the data object is in the WRITING_HDR_LEN, WRITING_HDR, WRITTEN_HDR, WRITING_DATA, INVALID_DATA, and ERASE_PARTIAL states. In an embodiment of the present invention, the reclamation process is invoked by the FDM when more memory space needs to be allocated to a data object in the volume 120. The reclamation operation takes advantage of the dual list arrangement of embodiments of the present invention by selecting the direction for allocating from one list and reclaiming from the other list, and reversing the direction when all data objects in the second list have been reclaimed. As a result, the data movement of the reclamation process provides the benefit of wear leveling by distributing the programming and erasing operations evenly across the flash memory device. It will be appreciated by one of ordinary skill in the art that during a reclamation process, linear objects 150, only those MS data objects 168 and SS data objects 180 having a VALID_DATA state will be copied when moving data objects from one list to the opposite list. That is, during reclamation of a container object, only MS data objects 168 and SS data objects 180 having a VALID_DATA state are copied into the new container object. In the event of a power loss, either the new or old container object will be recovered. In this manner, additional memory space can be recovered from within a container object during the reclamation process, further compacting data objects at one end of the volume 120. A more detailed description of a reclamation process that can be employed in embodiments of the present invention is provided in commonly assigned, co-pending U.S. application Ser. No. 10/232,955, entitled LINEAR OBJECT MAN- AGEMENT FOR A RANGE OF FLASH MEMORY, to Wong et al., filed Aug. 29, 2002, which is incorporated herein by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory system, comprising:
a non-volatile memory having an addressable range of memory in which a data structure for storing data objects in the addressable range of memory is stored, the data structure comprising a plurality of data objects stored contiguously in the addressable range of memory, the plurality of data objects including at least one first-type data object having a data field in which data is stored in consecutive memory addresses and further including at least one second-type data object having a data field in which non-linear objects are stored.

2. The memory system of claim 1 wherein the first-type data object comprises a linear object and the second type data object comprises a container object.

3. The memory system of claim 1 wherein the addressable range of memory is defined between a low memory address and a high memory address, and the plurality of data objects are stored contiguously in at least one of a first list associated with the low memory address and a second list associated with the high memory address.

4. The memory system of claim 1 wherein each of the plurality of data objects comprises:
a data object header record having a state field containing data representing an object state of the data object; and
a data object data record for storing data of the at least one data object.

5. The memory system of claim 4 wherein the header record further includes a header length field containing data representing the length of the header record of the data structure.

6. The memory system of claim 5 wherein the header record further includes a time stamp field containing data representing the time at which the data structure is written.

7. The memory system of claim 1 wherein the second-type of data object comprises:
a multiple segment data object header having a state field containing data representing an object state of the first of the plurality of data objects;
at least one multiple segment data object index table having a plurality of index entries, each of the index entries having a segment key field containing data representing a unique segment identifier and further having an index field containing data representing an index value; and
a corresponding plurality of segments of data, each segment of data referenced by an index entry in the data object index table.

8. The memory system of claim 1 wherein the second-type of data object comprises a plurality of single segment data objects, each single segment data object having a data object header record and a data object data record, the data object header record having a segment length field containing data representing a length of memory reserved for the data object data record and the data record containing data representing at least one data instance object, each data instance object having a data instance header including a data instance state field and a data instance length field, and each data instance object further having a data instance data field, the data instance length field containing data representing length information of the data instance data field and the data instance data field containing data having an object state represented by data contained in the data instance state field.

9. A memory system, comprising:
a non-volatile memory having a memory space; and
a computer-readable medium having computer-executable instructions for performing steps for storing data objects in the memory space, comprising:
defining in the memory space a range of memory having a starting memory address and an ending memory address, and further defining a first list of data objects associated with the starting memory address and defining a second list of data objects associated with the ending memory address;
writing a first data object to at least one of the first and second lists of the range of memory, the first data object having a header and a data field, the data field containing data stored at consecutive memory addresses; and
writing a second data object to at least one of the first and second lists of the range of memory, the second data object having a header and a data area, the data area containing at least one non-linear object.

10. The memory system of claim 9 wherein writing the first data object comprises writing a linear object having data representing consecutively addressed data in the data area.

11. The memory system of claim 9 wherein writing the second data object comprises writing a container object having a data area containing at least one non-linear object.

12. The memory system of claim 9 wherein the computer-readable medium further includes computer-executable instructions for writing data representing an object state of the respective data object to an object state field included in the header of at least one of the first and second data objects.

13. The memory system of claim 12 wherein the computer-readable medium further includes computer-executable instructions for writing data representing a header length to a header length field included in the header of at least one of the first and second data objects.

14. The memory system of claim 13 wherein the computer-readable medium further includes computer-executable instructions for writing data representing a time at which a data object is written to the range of memory to a time stamp field included in the header of at least one of the first and second data objects.

15. A memory system, comprising:
a non-volatile memory having a range of memory; and
a computer-readable medium having computer-executable instructions for performing steps for storing data objects in the non-volatile memory, comprising:
storing linear data objects in a linear object, the linear object defined in the range of memory and having a linear object header and a linear object data field in which the linear data objects are stored; and
storing non-linear data objects in a container object, the container object defined in the range of memory having a container object header and a container data field in which the non-linear data objects are stored.

16. The memory system of claim 15 wherein the computer-readable medium further includes computer-executable instructions for writing data representing an object state of the respective data object to an object state field included in at least one of the linear object header and the container object header.

17. The memory system of claim 16 wherein the computer-readable medium further includes computer-executable instructions for writing data representing a header length to a header length field included in at least one of the linear object header and the container object header.

18. The memory system of claim 17 wherein the computer-readable medium further includes computer-executable instructions for writing data representing a time at which a data object is written to the range of memory to a time stamp field included in at least one of the linear object header and the container object header.

19. An electronic device, comprising:
a non-volatile memory having a memory space;
a computer-readable medium having computer-executable instructions for performing steps for storing data objects in the memory space, comprising:
defining in the memory space a range of memory having a starting memory address and an ending memory address, and further defining a first list of data objects associated with the starting memory address and defining a second list of data objects associated with the ending memory address;
writing a first data object to at least one of the first and second lists of the range of memory, the first data object having a header and a data field, the data field containing data stored at consecutive memory addresses; and
writing a second data object to at least one of the first and second lists of the range of memory, the second data object having a header and a data area, the data area containing at least one non-linear object; and
a processor coupled to the non-volatile memory and the computer readable medium and operable to execute the computer-executable instructions.

20. The electronic device of claim 19 wherein the electronic device comprises a cellular phone.

21. The electronic device of claim 19 wherein writing the first data object comprises writing a linear object having data representing consecutively addressed data in the data area.

22. The electronic device of claim 19 wherein writing the second data object comprises writing a container object having a data area containing at least one non-linear object.

23. The electronic device of claim 19 wherein the computer-readable medium further includes computer-executable instructions for writing data representing an object state of the respective data object to an object state field included in the header of at least one of the first and second data objects.

24. The electronic device of claim 23 wherein the computer-readable medium further includes computer-executable instructions for writing data representing a header length to a header length field included in the header of at least one of the first and second data objects.

25. The electronic device of claim 24 wherein the computer-readable medium further includes computer-executable instructions for writing data representing a time at which a data object is written to the range of memory to a time stamp field included in the header of at least one of the first and second data objects.

26. An electronic device, comprising:
a non-volatile memory having a range of memory;
a computer-readable medium having computer-executable instructions for performing steps for storing data objects in the non-volatile memory, comprising:
storing linear data objects in a linear object, the linear object defined in the range of memory and having a linear object header and a linear object data field in which the linear data objects are stored; and
storing non-linear data objects in a container object, the container object defined in the range of memory having a container object header and a container data field in which the non-linear data objects are stored; and
a process coupled to the non-volatile memory and the computer-readable medium and operable to execute the computer-executable instructions.

27. The electronic device of claim 26 wherein the electronic device comprises a cellular phone.

28. The electronic device of claim 26 wherein the computer-readable medium further includes computer-executable instructions for writing data representing an object state of the respective data object to an object state field included in at least one of the linear object header and the container object header.

29. The electronic device of claim 28 wherein the computer-readable medium further includes computer-executable instructions for writing data representing a header length to a header length field included in at least one of the linear object header and the container object header.

30. The electronic device of claim 29 wherein the computer-readable medium further includes computer-executable instructions for writing data representing a time at which a data object is written to the range of memory to a time stamp field included in at least one of the linear object header and the container object header.

31. An electronic device, comprising:
a non-volatile memory having an addressable range of memory in which a data structure for storing data objects in the addressable range of memory is stored, the data structure comprising a plurality of data objects stored contiguously in the addressable range of memory, the plurality of data objects including at least one first-type data object having a data field in which data is stored in consecutive memory addresses and further including at least one second-type data object having a data field in which non-linear objects are stored; and
a processor coupled to the non-volatile memory and operable to store and retrieve data objects from the non-volatile memory.

32. The electronic device of claim 31 wherein the first-type data object comprises a linear object and the second type data object comprises a container object.

33. The electronic device of claim 31 wherein the addressable range of memory is defined between a low memory address and a high memory address, and the plurality of data objects are stored contiguously in at least one of a first list associated with the low memory address and a second list associated with the high memory address.

34. The electronic device of claim 31 wherein each of the plurality of data objects comprises:
a data object header record having a state field containing data representing an object state of the data object; and
a data object data record for storing data of the at least one data object.

35. The electronic device of claim 34 wherein the header record further includes a header length field containing data representing the length of the header record of the data structure.

36. The electronic device of claim 35 wherein the header record further includes a time stamp field containing data representing the time at which the data structure is written.

37. The electronic device of claim 31 wherein the second-type of data object comprises:

a multiple segment data object header having a state field containing data representing an object state of the first of the plurality of data objects;

at least one multiple segment data object index table having a plurality of index entries, each of the index entries having a segment key field containing data representing a unique segment identifier and further having an index field containing data representing an index value; and a corresponding plurality of segments of data, each segment of data referenced by an index entry in the data object index table.

38. The electronic device of claim 31 wherein the second-type of data object comprises a plurality of single segment data objects, each single segment data object having a data object header record and a data object data record, the data object header record having a segment length field containing data representing a length of memory reserved for the data object data record and the data record containing data representing at least one data instance object, each data instance object having a data instance header including a data instance state field and a data instance length field, and each data instance object further having a data instance data field, the data instance length field containing data representing length information of the data instance data field and the data instance data field containing data having an object state represented by data contained in the data instance state field.

* * * * *